(12) United States Patent
Ishii et al.

(10) Patent No.: US 10,341,954 B2
(45) Date of Patent: Jul. 2, 2019

(54) COMMUNICATION TERMINAL DEVICE FOR AVOIDING INOPERATIVE STATE CAUSED BY EXCESSIVE POWER CONSUMPTION AND COMMUNICATION CONTROL METHOD THEREFORE

(71) Applicant: HITACHI KOKUSAI ELECTRIC INC., Tokyo (JP)

(72) Inventors: Takahito Ishii, Tokyo (JP); Takekazu Yoshinaga, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 50 days.

(21) Appl. No.: 15/510,757

(22) PCT Filed: Sep. 29, 2015

(86) PCT No.: PCT/JP2015/077499
§ 371 (c)(1),
(2) Date: Mar. 13, 2017

(87) PCT Pub. No.: WO2016/067812
PCT Pub. Date: May 6, 2016

(65) Prior Publication Data
US 2017/0289912 A1 Oct. 5, 2017

(30) Foreign Application Priority Data
Oct. 30, 2014 (JP) ................. 2014-221839

(51) Int. Cl.
*H04W 52/02* (2009.01)
*H04B 1/40* (2015.01)
(Continued)

(52) U.S. Cl.
CPC .......... *H04W 52/0235* (2013.01); *H04B 1/40* (2013.01); *H04L 1/00* (2013.01);
(Continued)

(58) Field of Classification Search
None
See application file for complete search history.

(56) References Cited

U.S. PATENT DOCUMENTS

| 4,449,248 A * | 5/1984 | Leslie ............... H04B 1/40 340/7.36 |
| 2003/0103577 A1 | 6/2003 | Harada et al. |

(Continued)

FOREIGN PATENT DOCUMENTS

| JP | 2002-152837 A | 5/2002 |
| JP | 2003-169018 A | 6/2003 |

(Continued)

OTHER PUBLICATIONS

International Search Report dated Dec. 22, 2015.

*Primary Examiner* — Anh Ngoc M Nguyen
(74) *Attorney, Agent, or Firm* — Bacon & Thomas, PLLC (57) ABSTRACT

In a communication control method for a communication terminal device including a plurality of communication units corresponding to different communication schemes or communication systems to perform communication in parallel, when a first communication unit performs transmission, transmission/reception of another communication unit is stopped. Then, a transmission/reception stop duration of the another communication unit is set to be equal to or less than a predetermined number of synchronization protection stages.

6 Claims, 11 Drawing Sheets

(51) Int. Cl.
    *H04M 1/73*     (2006.01)
    *H04W 88/06*     (2009.01)
    *H04W 24/08*     (2009.01)
    *H04L 1/00*     (2006.01)
    *H04L 1/22*     (2006.01)
    *H04L 1/20*     (2006.01)

(52) U.S. Cl.
    CPC ................ *H04L 1/22* (2013.01); *H04M 1/73* (2013.01); *H04W 24/08* (2013.01); *H04W 52/0274* (2013.01); *H04W 88/06* (2013.01); *H04L 1/20* (2013.01); *Y02D 70/00* (2018.01); *Y02D 70/40* (2018.01)

(56) References Cited

U.S. PATENT DOCUMENTS

2012/0040715 A1*   2/2012   Fu ........................ H04B 1/1027
                                                                             455/553.1
2012/0163307 A1     6/2012   Wang et al.

FOREIGN PATENT DOCUMENTS

| JP | 2009-005195 A | 1/2009 |
|---|---|---|
| JP | 2010-278764 A | 12/2010 |
| JP | 2013-534386 A | 9/2013 |

* cited by examiner

COMMUNICATION TERMINAL DEVICE FOR AVOIDING INOPERATIVE STATE CAUSED BY EXCESSIVE POWER CONSUMPTION AND COMMUNICATION CONTROL METHOD THEREFORE

FIELD OF THE INVENTION

The present invention relates to a communication control method for a communication terminal device and a communication terminal device.

BACKGROUND OF THE INVENTION

A conventional communication terminal device will be described with reference to FIGS. 9 and 10.

Figure 9:
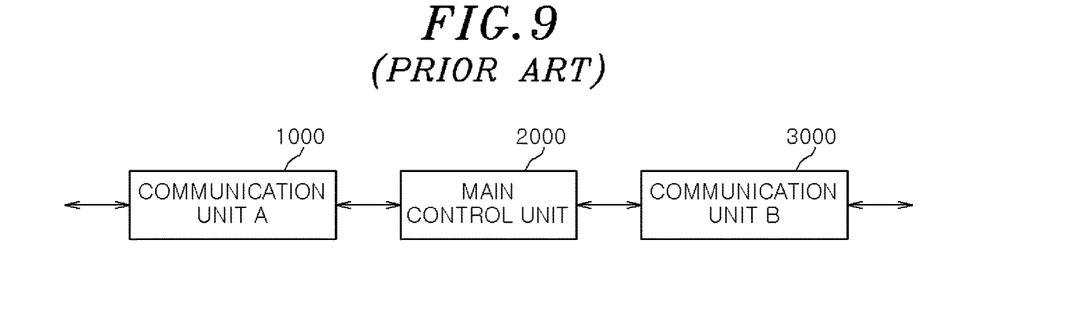
FIG. 9 shows an example of a configuration of a conventional communication terminal device.

FIG. 9 shows an example of a configuration of a conventional communication terminal device in which different communication schemes or communication systems are implemented in the same communication terminal device to perform communication in parallel.

In FIG. 9, reference numeral 1000 denotes a communication unit A, reference numeral 2000 denotes a main control unit of the communication terminal device, and reference numeral 3000 denotes a communication unit B having a communication scheme different from that of the communication unit A.

Each of the communication unit A and the communication unit B performs communication in accordance with the specifications of its communication scheme and protocol.

Figure 10:
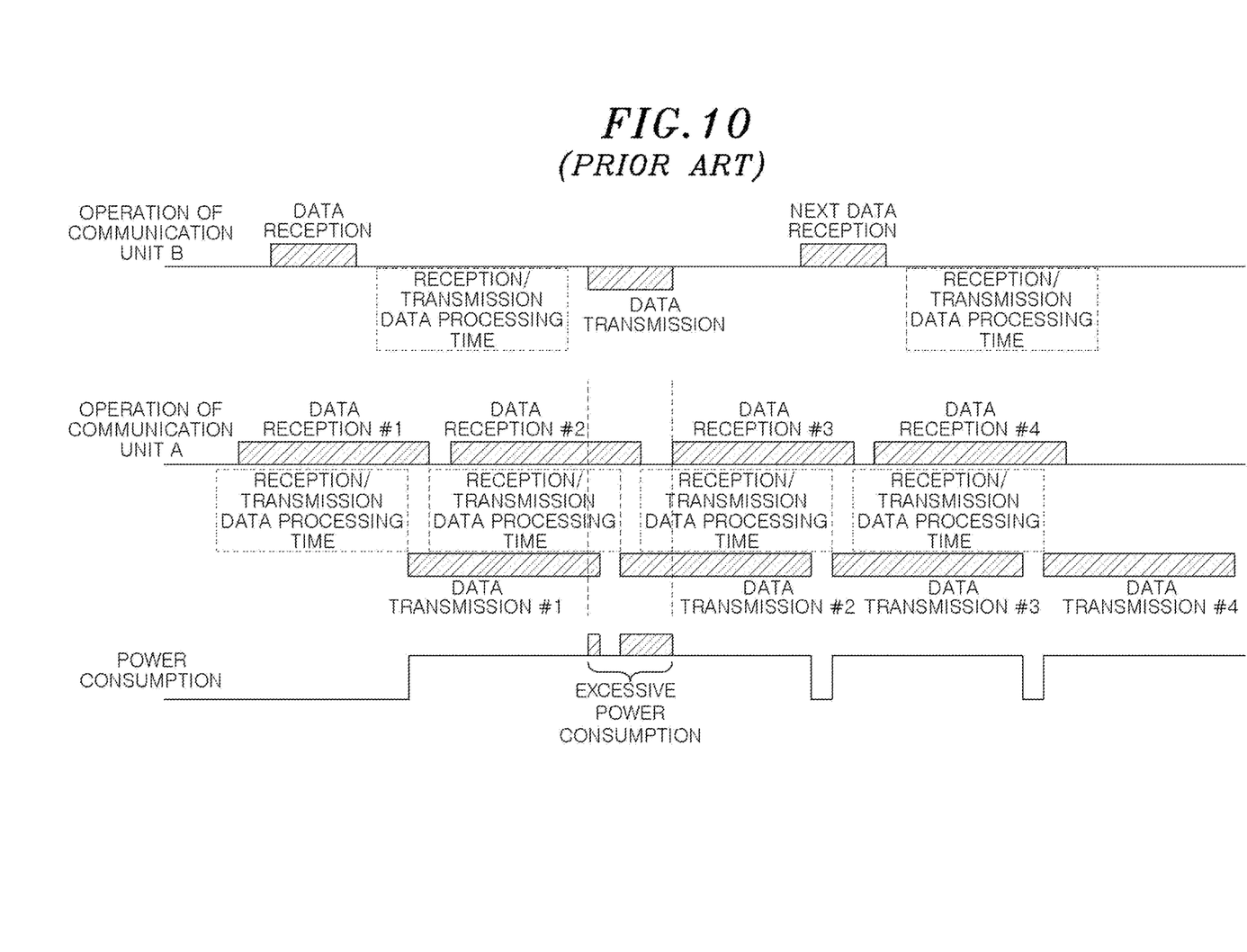
FIG. 10 shows an operation example of communication units A and B in the conventional communication terminal device and an example of the power consumption at that time.

FIG. 10 shows an operation example of the communication units A and B in the conventional communication terminal device and an example of the power consumption at that time.

The operation of FIG. 10 is based on the assumption that when data is transmitted from a communication device (not shown) corresponding to the communication terminal device of FIG. 9, each of the communication units A and B receives the data, performs data processing, and sends the result.

Each of the communication unit A and the communication unit B independently performs reception processing, data processing and transmission processing. As the operation of the communication unit A, when data is received by data reception #1, data processing is performed based on the received data, and the result is transmitted by data transmission #1. The communication unit B performs the same operation as the communication unit A. When the operation of the communication units A and B is performed as shown in FIG. 10, the power consumption is higher at the timing of transmission of each of the communication units A and B than in other cases, and the sum of the power consumptions of the communication units A and B becomes the power consumption of the communication terminal device.

However, in the operation of the conventional communication terminal device shown in FIG. 10, since each of the communication units A and B independently performs transmission/reception processing, if their transmission timings overlap each other, the power consumption at that timing becomes large, and exceeds the power consumption allowed for the communication terminal device, thereby making the communication terminal device inoperative, which is problematic.

Further, Patent Document 1 relates to a mobile phone having a communication function using a PDC scheme and a PHS scheme, and particularly discloses a mobile phone configured to stop a PHS system when a PDC system is busy by making and receiving a telephone call, and restart the PHS system when the telephone call of the PDC system is completed, and a method for reducing its current consumption.

Patent Document 1: Japanese Patent Application Publication No. 2002-152837

SUMMARY OF THE INVENTION

An object of the present invention is to avoid an inoperative state caused by excessive power consumption when a plurality of communication units corresponding to different communication schemes or different communication systems are implemented in a communication terminal device to perform communication in parallel.

In accordance with an aspect, there is provided a communication control method for a communication terminal device including a plurality of communication units corresponding to different communication schemes or communication systems to perform communication in parallel, the method including: when a first communication unit performs transmission, stopping transmission/reception of another communication unit; and setting a transmission/reception stop duration of the another communication unit to be equal to or less than a predetermined number of synchronization protection stages.

In accordance with another aspect, there is provided a communication control method for a communication terminal device including a plurality of communication units corresponding to different communication schemes or communication systems to perform communication in parallel, the method including: when a first communication unit performs transmission, stopping transmission/reception of another communication unit; determining a presence or absence of a transmission stop frame of the another communication unit; calculating an estimated frame error rate of the another communication unit; comparing the estimated frame error rate with a predetermined value; and prohibiting a transmission/reception stop of the another communication unit when the estimated frame error rate exceeds the predetermined value.

In accordance with still another aspect, there is provided a communication control method for a communication terminal device including a plurality of communication units corresponding to different communication schemes or communication systems to perform communication in parallel, the method including: when a first communication unit performs transmission, stopping transmission/reception of another communication unit; determining that the another communication unit is in an intermittent transmission/reception state in a standby state; prohibiting the transmission/reception stop when the another communication unit starts intermittent transmission/reception; and permitting the transmission/reception stop again when the another communication unit ends the intermittent transmission/reception.

In accordance with still another aspect, there is provided a communication control method for a communication terminal device including a plurality of communication units corresponding to different communication schemes or communication systems to perform communication in parallel, the method including: when a first communication unit performs transmission, stopping transmission/reception of another communication unit; transmitting radio waves by the plurality of communication units; performing conversion from a radio frequency signal into a baseband signal, or conversion from a baseband signal into a radio frequency signal; performing a baseband demodulation process or a data decoding process; performing a data encoding process for transmitting data to network; separating control data and user data in data communication with an outside; turning transmission/reception ON/OFF by a control signal from the outside; and outputting a communication unit OFF prohibition signal to the outside.

In accordance with still another aspect, there is provided a communication control method for a communication terminal device including a plurality of communication units corresponding to different communication schemes or communication systems to perform communication in parallel, the method including: when a first communication unit performs transmission, stopping transmission/reception of another communication unit.

In accordance with still another aspect, there is provided a communication terminal device including a plurality of communication units corresponding to different communication schemes or communication systems and a control unit, wherein each of the communication units includes an antenna unit, a radio unit, a baseband unit, an external interface unit, and a communication control unit, and wherein the communication terminal device operates in the communication control method of the communication terminal device described above.

In accordance with still another aspect, there is provided a communication terminal device including a plurality of communication units corresponding to different communication schemes or communication systems to perform communication in parallel, wherein a first communication unit stores in advance a radio unit OFF time which is within an out-of-synchronization time until a second communication unit causes out-of-synchronization due to continuous radio unit OFF, and upon detecting its own data transmission timing, the first communication unit outputs a radio unit OFF signal, for allowing a radio unit of the second communication unit to stop transmission/reception, at the data transmission timing in the radio unit OFF time which is within the out-of-synchronization time, and wherein the radio unit of the second communication unit stops transmission/reception of the radio unit by the radio unit OFF signal.

In the communication terminal device, upon receiving the radio unit OFF signal from the first communication unit, the second communication unit calculates an estimated frame error rate, compares the estimated frame error rate with a predetermined value, and outputs a stop instruction of the radio unit OFF signal to the first communication unit when the estimated frame error rate exceeds a predetermined value.

In the communication terminal device, upon receiving the radio unit OFF signal from the first communication unit, the second communication unit determines whether the communication unit is in an intermittent transmission/reception state in a standby state, and when the communication unit is in the intermittent transmission/reception state, the second communication unit outputs a stop instruction of the radio unit OFF signal at the start of intermittent transmission/reception, and stops the output of the stop instruction of the radio unit OFF signal at the end of intermittent transmission/reception.

Effect of the Invention

In accordance with the present invention, it is possible to avoid an inoperative state caused by excessive power consumption when a plurality of communication units corresponding to different communication schemes or different communication systems are implemented in a communication terminal device to perform communication in parallel.

DETAILED DESCRIPTION OF THE EMBODIMENTS

Hereinafter, embodiments of the present invention will be described with reference to the accompanying drawings which form a part hereof.

A configuration of a communication terminal device according to an embodiment of the present invention will be described with reference to FIGS. 1 and 2.

Figure 1:
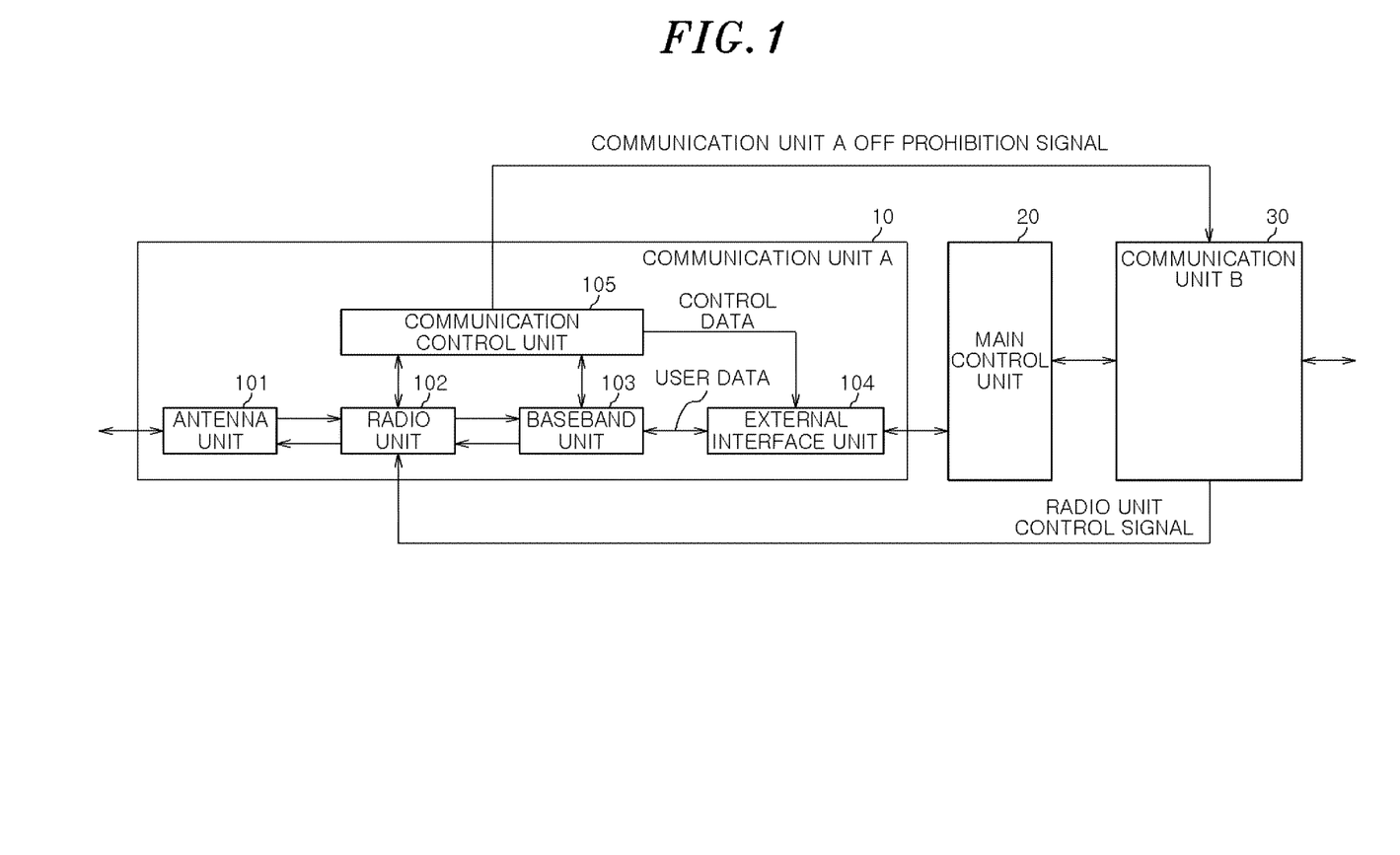
FIG. 1 is a diagram showing a configuration example 1 of a communication terminal device according to an embodiment of the present invention.

In FIG. 1, the communication terminal device includes a communication unit A 10, a communication unit B 30, and a main control unit 20.

Each of the communication unit A 10 and the communication unit B 30 includes an antenna unit 101, a radio unit 102, a baseband unit 103, an external interface unit 104, and a communication control unit 105.

The communication unit A 10 and the communication unit B 30 have different communication schemes.

Figure 2:
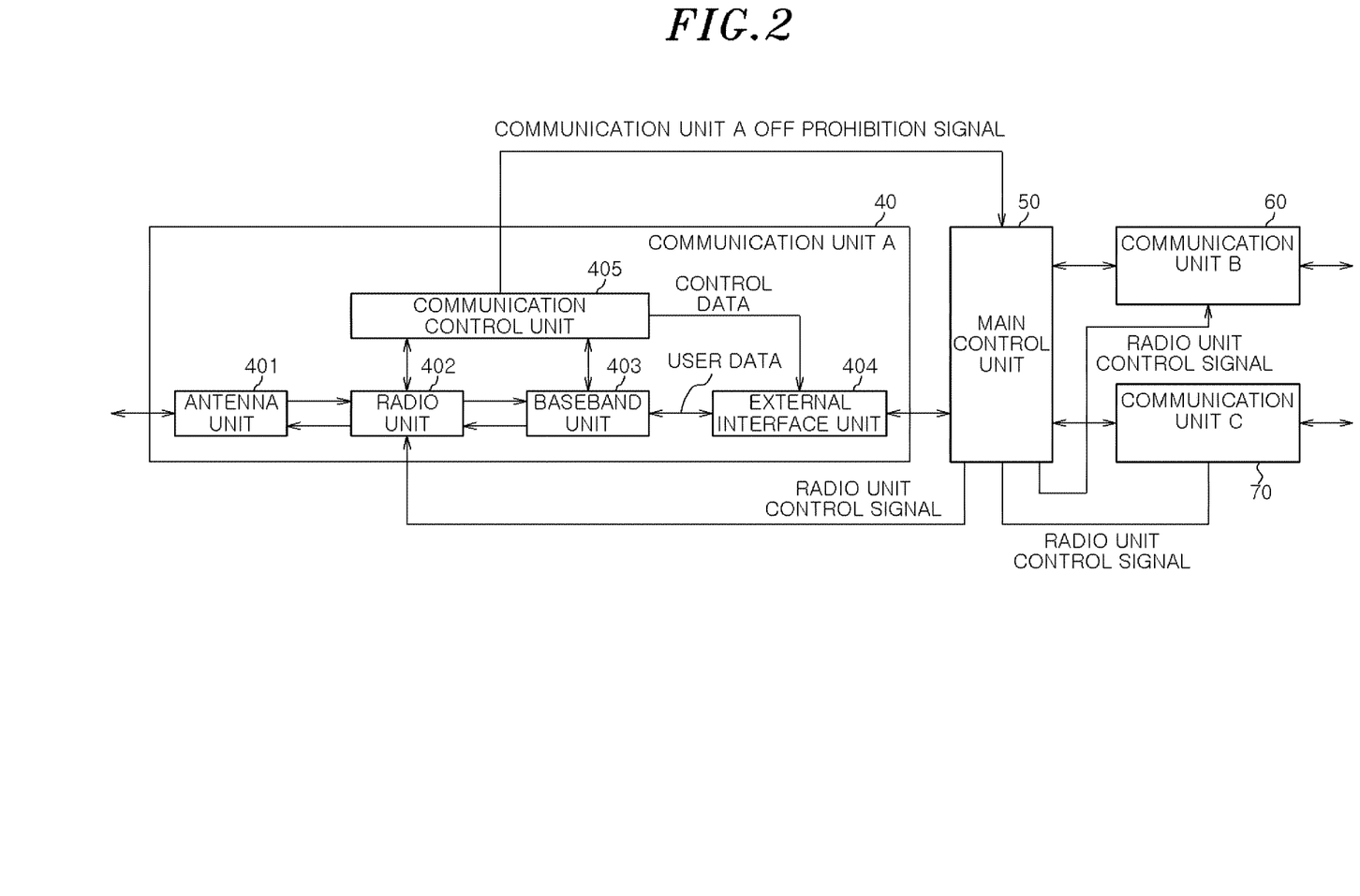
FIG. 2 is a diagram showing a configuration example 2 of a communication terminal device according to an embodiment of the present invention.

In FIG. 2, the communication terminal device includes a communication unit A 40, a communication unit B 60, a communication unit C 70, and a main control unit 50.

Each of the communication unit A 40, the communication unit B 60 and the communication unit C 70 includes an antenna unit 401, a radio unit 402, a baseband unit 403, an external interface unit 404, and a communication control unit 405.

The communication unit A 40, the communication unit B 60 and the communication unit C 70 have different communication schemes.

The antenna units 101 and 401 are configured to transmit high-frequency energy as radio waves to a space, or conversely convert radio waves in a space into high-frequency energy and receive the high-frequency energy.

The radio units 102 and 402 are configured to perform conversion from a radio frequency signal into a baseband signal, or conversion from a baseband signal into a radio frequency signal in communication with a base station device (not shown).

Further, the radio units 102 and 402 are configured to receive a radio unit control signal from the outside such that ON/OFF of the radio units can be controlled according to the input radio unit control signal.

The baseband units 103 and 403 are configured to perform a data decoding process or a baseband demodulation process on the converted baseband signal, and perform a baseband modulation process or a data encoding process for transmitting data to the network via the radio units 102 and 402.

The external interface units 104 and 404 are configured to perform separation and input/output of control data and user data in data communication with the main control units 20 and 50.

The communication control units 105 and 405 are configured to perform overall control of the communication unit A.

Further, a communication unit OFF prohibition signal is outputted from the communication control units 105 and 405. Thus, the communication unit A can send notification to the outside that the OFF control of the radio unit is prohibited by the communication unit OFF prohibition signal.

First Embodiment

Next, an operation of the communication terminal device according to an embodiment of the present invention will be described with reference to FIGS. 1, 3, 4 and 5.

Figure 3:
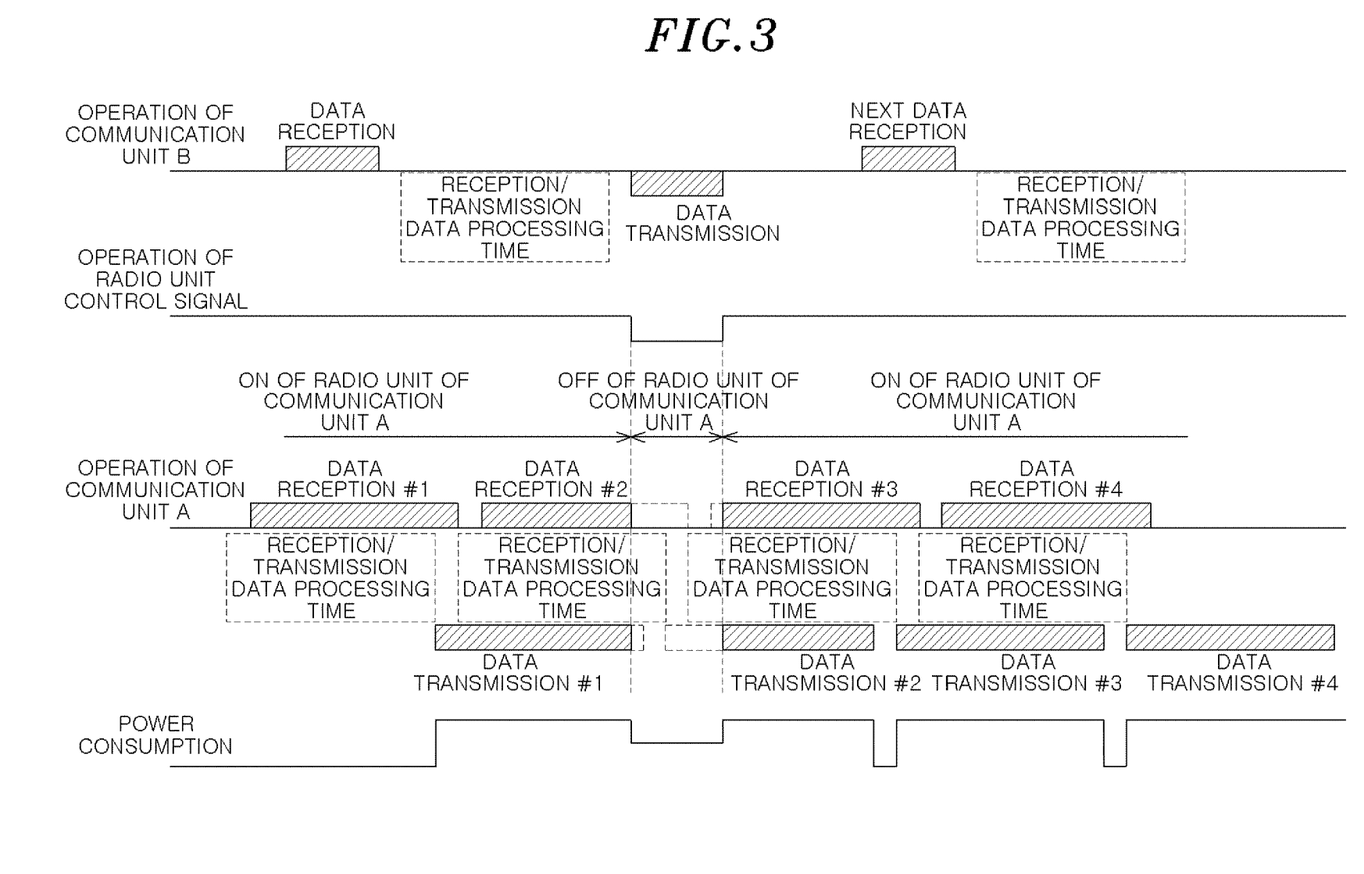
FIG. 3 is a timing chart explaining an operation example of communication units A and B in the communication terminal device according to an embodiment of the present invention, an operation of the radio unit control signal and power consumption at that time.

FIG. 3 is a timing chart explaining an operation example of the communication units A and B in the communication terminal device according to an embodiment of the present invention, an operation of the radio unit control signal and power consumption at that time.

In FIG. 3, each of the communication unit A and the communication unit B independently performs reception processing, data processing and transmission processing.

As an operation of the communication unit A, basically, when data is received by data reception #1, data processing is performed based on the received data, and the result is transmitted by data transmission #1.

The communication unit B performs basically the same operation.

Next, a case where there is a timing at which the communication unit A and the communication unit B simultaneously perform transmission will be described.

If the communication unit A and the communication unit B simultaneously perform transmission, the power consumption of the communication terminal device may exceed an allowable value.

At the timing when the communication unit B performs transmission, the radio unit control signal is controlled to perform OFF control of the radio unit of the communication unit A. Accordingly, in a radio unit OFF section of the communication unit A, the transmission of the communication unit A is turned OFF, so that the power consumption can be prevented from exceeding the allowable value as shown in FIG. 3.

However, in the radio unit OFF section of the communication unit A, since the signal to be originally sent is not transmitted by the control, a radio section error occurs in communication with a communication device facing the communication unit A.

When the radio section error continues, communication disconnection or reconnection occurs, and the communication quality deteriorates significantly. In order to avoid this situation, constraints are provided in the radio unit OFF section.

Next, constraints on the radio unit OFF section according to an embodiment of the present invention will be described with reference to FIGS. 1, 4A and 4B.

Figure 4A:
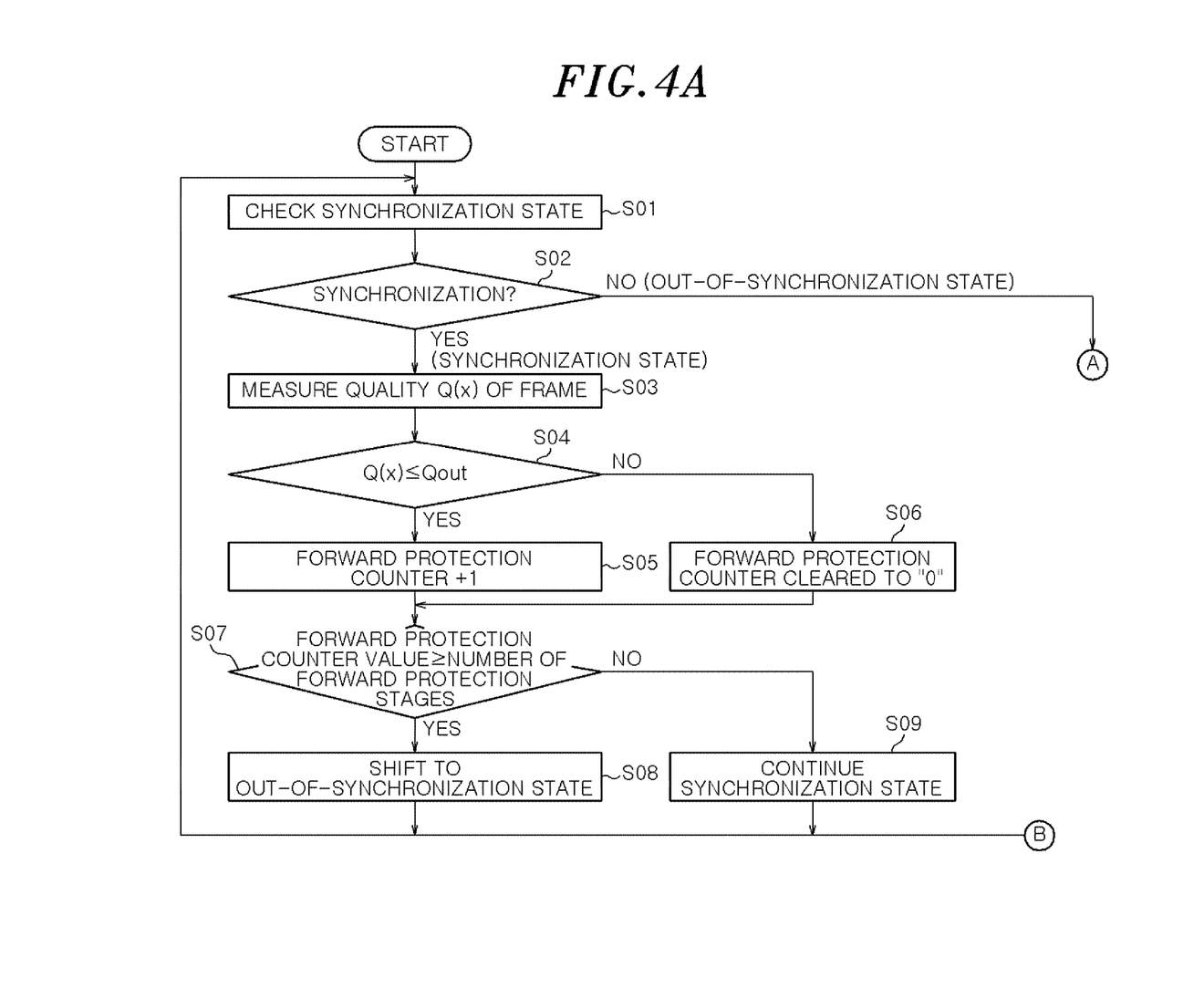
FIGS. 4A and 4B are an operation flow diagram explaining an operation of a communication terminal device according to an embodiment of the present invention.
Figure 4B:
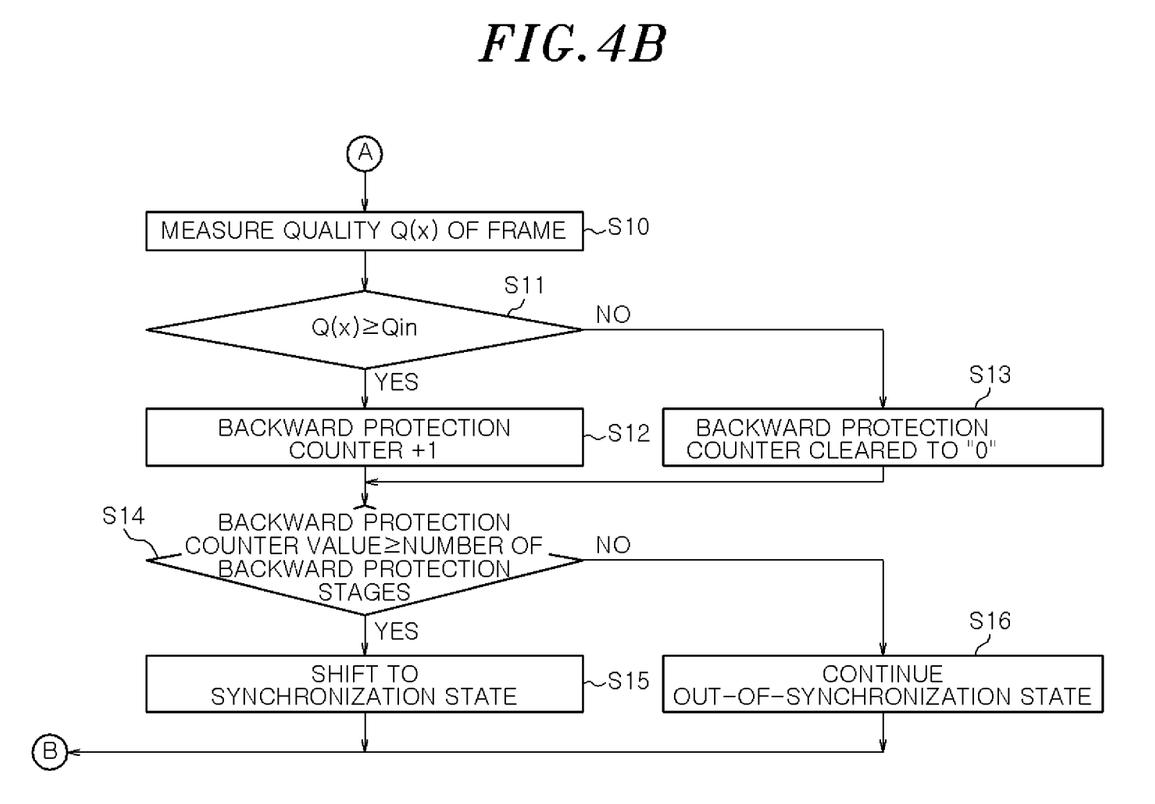

FIGS. 4A and 4B show an operation flow diagram explaining an operation of a communication terminal device according to an embodiment of the present invention.

In FIGS. 4A and 4B, the communication control unit 105 checks whether a current communication state is a synchronization state or an out-of-synchronization state (S01), and the operation proceeds to step S02.

In step S02, it is determined whether synchronization is established. If synchronization is established (YES), the operation proceeds to step S03, and if synchronization is not established (NO), the operation proceeds to step S10.

In step S03, a quality $Q(x)$ of a frame which is a transmission unit of a signal (data) is measured. For example, the frame quality may be measured by the number of error data for known data between transmission and reception time-multiplexed to frame data.

In step S04, the measured quality $Q(x)$ is compared with a frame quality insufficiency determination threshold Qout. If the quality $Q(x)$ is equal to or smaller than the threshold Qout (YES), it is determined that the quality is insufficient and the operation proceeds to step S05. If the quality $Q(x)$ is greater than the threshold Qout (NO), it is determined that the quality is sufficient and the operation proceeds to step S06.

In step S05, a forward protection counter is incremented by one (+1) and the operation proceeds to step S07.

In step S06, the forward protection counter is cleared to "0" and the operation proceeds to step S07.

In step S07, the counter value of the forward protection counter is compared with the number of forward protection stages. If the forward protection counter value is equal to or greater than the number of forward protection stages (YES), it is determined that the insufficient quality frames are consecutive and the operation proceeds to step S08. If the forward protection counter value is smaller than the number of forward protection stages (NO), it is determined that it is still in the synchronization state and the operation proceeds to step S09.

In step S08, the state shifts to the out-of-synchronization state, and the operation returns to step S01.

In step S09, the synchronization state is continued and the operation returns to step S01.

In step S10, a quality $Q(x)$ of a frame which is a transmission unit of a signal (data) is measured, and the operation proceeds to step S11.

In step S11, the measured quality $Q(x)$ is compared with a frame quality sufficiency determination threshold Qin. If the quality $Q(x)$ is equal to or greater than the threshold Qin (YES), it is determined that the quality is sufficient and the operation proceeds to step S12. If the quality Q(x) is smaller than the threshold Qin (NO), it is determined that the quality is insufficient and the operation proceeds to step S13.

In step S12, a backward protection counter is incremented by one (+1) and the operation proceeds to step S14.

In step S13, the backward protection counter is cleared to "0" and the operation proceeds to step S14.

In step S14, the counter value of the backward protection counter is compared with the number of backward protection stages. If the backward protection counter value is equal to or greater than the number of backward protection stages (YES), it is determined that sufficient quality frames are consecutive and the operation proceeds to step S15. If the backward protection counter value is smaller than the number of backward protection stages (NO), it is determined that it is still in the out-of-synchronization state and the operation proceeds to step S16.

In step S15, the state shifts to the synchronization state, and the operation returns to step S01.

In step S16, the out-of-synchronization state is continued and the operation returns to step S01.

As described above, determination on synchronization or out-of-synchronization of radio communication is performed such that the state shifts to the synchronization state when the quality is insufficient or sufficient quality frames are consecutive. In other words, when the quality is insufficient or the number of sufficient quality frames which are consecutive is less than the number of protection stages, the state does not shift to the synchronization state.

Next, an operation of avoiding excessive power consumption without shifting the communication state by setting the radio unit OFF section to be equal to or less than the number of synchronization protection stages according to an embodiment of the present invention will be described with reference to FIG. 5.

Figure 5:
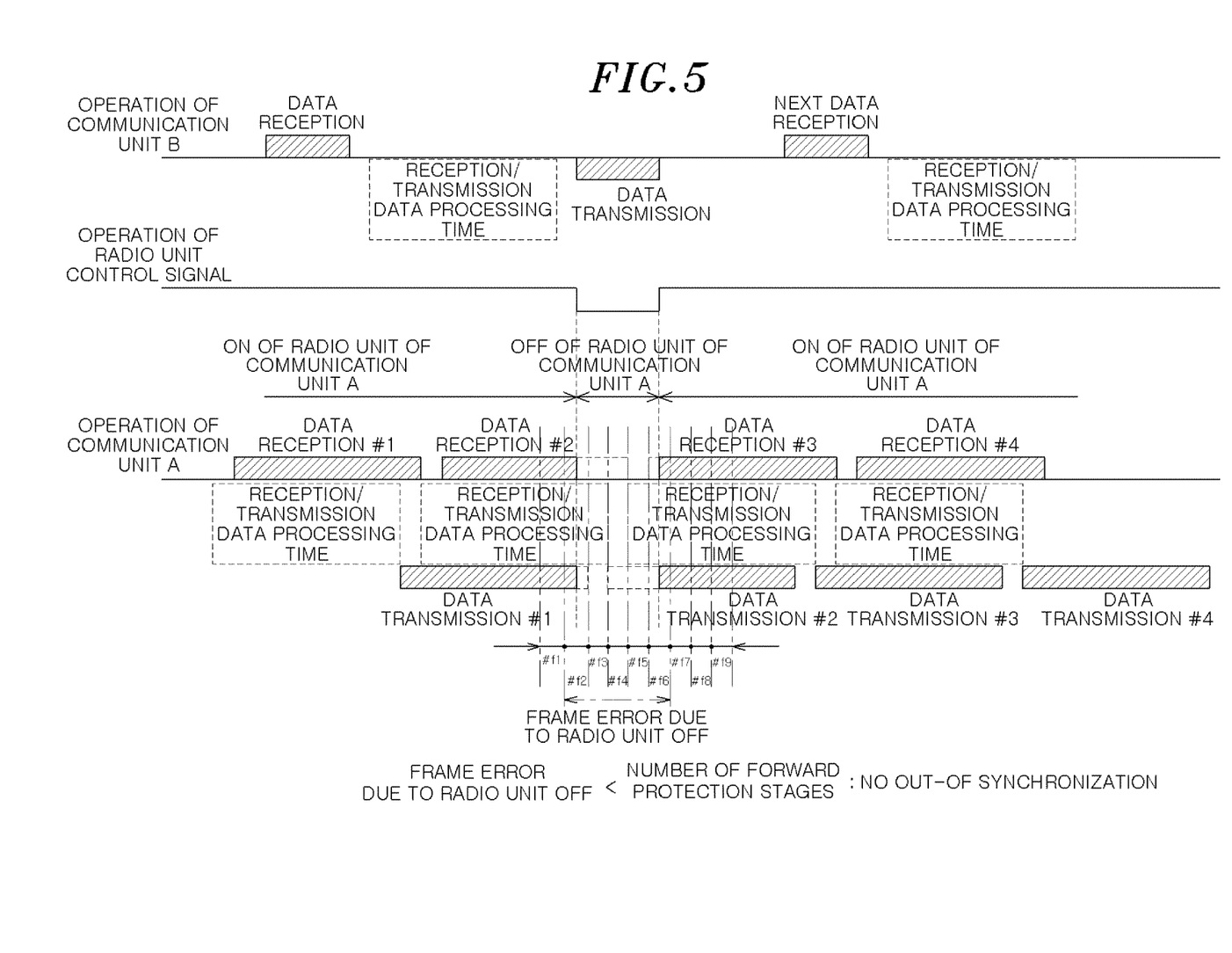
FIG. 5 is a timing chart explaining a relationship between the occurrence of a frame error in an operation of the communication unit A and the radio section OFF of the communication terminal device according to an embodiment of the present invention.

FIG. 5 is a timing chart explaining a relationship between the occurrence of a frame error in an operation of the communication unit A and the radio section OFF of the communication terminal device according to an embodiment of the present invention.

In the operation of the communication unit A in FIG. 5, although frames #f1 to #f9 are illustrated, the transmission of frames #f2 to #f6 is off by the radio unit OFF control. Accordingly, in the communication device corresponding to the communication unit A, a radio section error occurs in the reception of frames #f2 to #f6.

However, if the radio section error due to the radio unit OFF control is less than the number of forward protection stages, out-of-synchronization does not occur despite the occurrence of the error. Accordingly, communication disconnection or reconnection does not occur.

That is, in the same manner as a conventional radio section error, it is possible to restore a data error by error correction processing of the radio section using the communication scheme applied to the communication unit A, or retransmission control of the radio section using a wireless protocol. Also, compared to a case where the communication terminal device becomes inoperative due to excessive power consumption, it is possible to reduce the influence thereof.

In order to ensure that the radio section error due to the radio unit OFF control is less than the number of forward protection stages, for example, one transmission data unit of the communication unit B which performs communication in parallel with the communication unit A is set in advance to be less than the number of protection stages of the communication unit A.

Further, the communication unit A stores in advance a radio unit OFF time which is within an out-of-synchronization time until the communication unit B causes out-of-synchronization due to continuous radio unit OFF. Upon detecting its own data transmission timing, the communication unit A outputs a radio unit OFF signal, for allowing the radio unit of the communication unit B to stop transmission/reception, at the data transmission timing in the radio unit OFF time which is within the out-of-synchronization time. Then, the radio unit of the communication unit B may stop transmission/reception of the radio unit by the radio unit OFF signal.

Second Embodiment

Next, an operation of the communication terminal device according to an embodiment of the present invention will be described with reference to FIGS. 2, 6 and 7.

In the configuration of FIG. 2, the communication unit B 60 or the communication unit C 70 does not directly operate the radio unit control signal of the communication unit A 40. Instead, the main control unit 50 obtains information on the transmission state and the transmission timing of the communication unit B 60 and the communication unit C 70, and operates the radio unit control signal of the communication section A 40. Thus, this embodiment can be applied to even a case where three or more communication units are implemented.

As described above, an exclusive control method has been described in which constraints are provided in the radio unit OFF section to suppress the continuation of the radio section error, and communication disconnection or reconnection does not occur. However, due to a data error in the radio unit OFF section, a throughput of communication is degraded.

That is, depending on the frequency of the radio section OFF, although the synchronization state continues, the throughput is degraded significantly. In order to avoid this phenomenon, a radio unit OFF prohibition section is provided.

Next, a radio unit OFF prohibition section according to an embodiment of the present invention will be described with reference to FIGS. 6 and 7.

Figure 6:
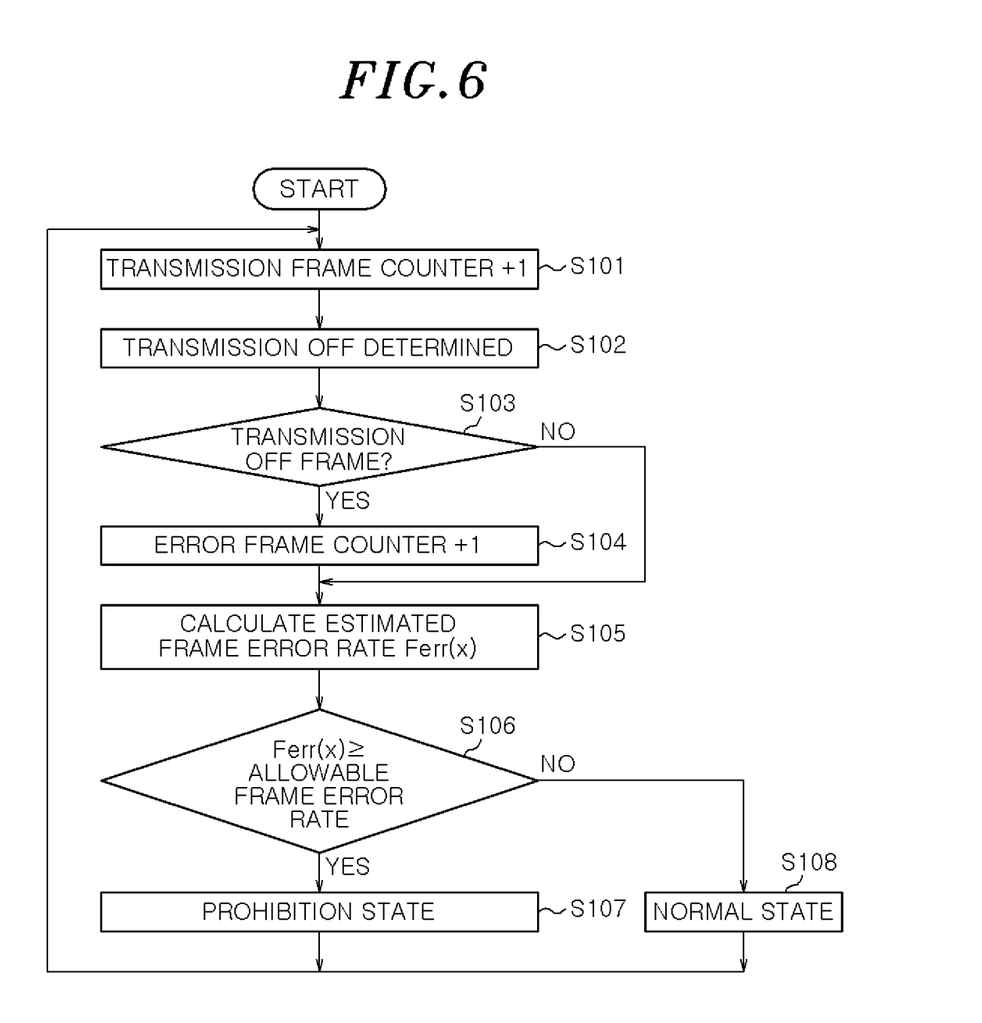
FIG. 6 is an operation flow diagram of a radio unit OFF prohibition control through calculation of an estimated frame error rate of the communication terminal device according to an embodiment of the present invention.

FIG. 6 is an operation flow diagram of a radio unit OFF prohibition control through calculation of an estimated frame error rate of the communication terminal device according to an embodiment of the present invention.

Figure 7:
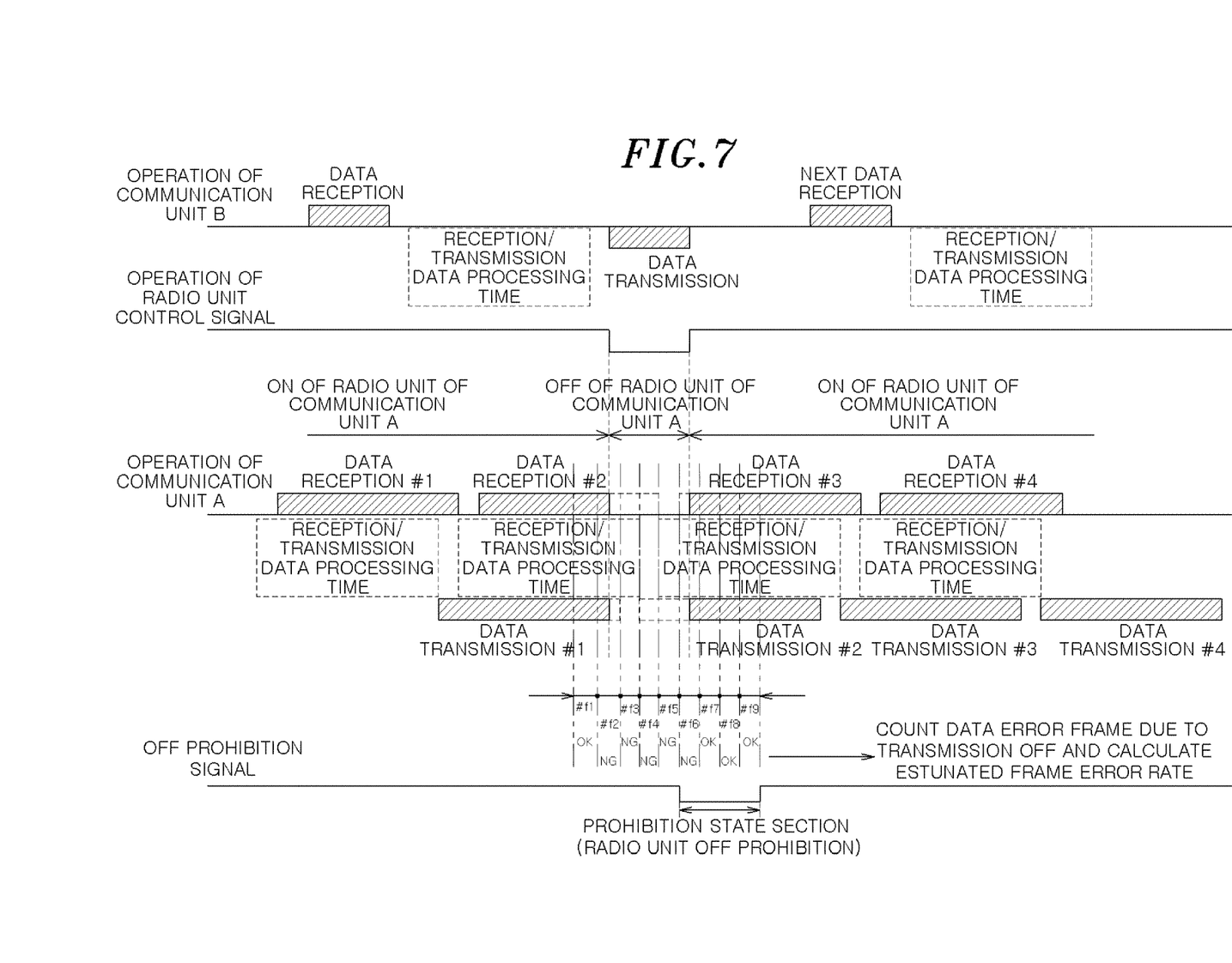
FIG. 7 is a conceptual diagram explaining an operation of an OFF prohibition signal of the communication terminal device according to an embodiment of the present invention.

FIG. 7 is a diagram explaining an operation of an OFF prohibition signal of the communication terminal device according to an embodiment of the present invention.

As described above, by the radio section OFF, the frame data corresponding to the section has a radio section error. Based on the radio section error, a frame error rate is calculated.

In the operation flow of FIG. 6, the communication control unit 405 first increments the counter value of a transmission frame counter based on the frame transmission state of the transmission data acquired from the baseband unit (S101).

Specifically, the counter value is set to +1 if actual data transmission is performed and ±0 if actual data transmission is not performed.

In step S102, it is determined whether the actual data transmission is in a transmission OFF section, and the operation proceeds to step S103.

In step S103, it is determined whether it is a transmission OFF frame. If it is a transmission OFF frame (YES), the process proceeds to step S104, and if it is not a transmission OFF frame (NO), the operation proceeds to step S105.

In step S104, an error frame counter is incremented by one (+1) and the operation proceeds to step S105.

In step S105, an estimated frame error rate Ferr(x) is calculated and the operation proceeds to S106.

The estimated frame error rate Ferr(x) is obtained by the following equation.

$$\text{Ferr}(x) = (\text{error frame counter value})/(\text{transmission frame counter value})$$

In step S106, the estimated frame error rate Ferr(x) is compared with an allowable frame error rate. If the estimated frame error rate Ferr(x) is equal to or greater than the allowable frame error rate (YES), it is determined that there is a high possibility that the throughput is significantly reduced due to a frame error caused by turning the radio unit OFF, and the operation proceeds to step S107. If the estimated frame error rate Ferr(x) is smaller than the allowable frame error rate (NO), it is determined that the throughput has not been significantly reduced due to the frame error caused by turning the transmission off, and the operation proceeds to step S108.

The allowable frame error rate is set as a value that can satisfy a practically achievable throughput based on the specifications of the communication scheme applied to the communication unit A.

In step S107, the communication control unit 405 activates a radio unit OFF prohibition signal for sending notification to the outside that the OFF of the radio unit is prohibited so that the radio unit is not turned off any more, and the operation returns to step S101.

In step S108, it is determined that the throughput has not been significantly reduced, a normal state in which the OFF of the radio unit is not prohibited is maintained, and the operation returns to step S101.

Next, an operation of the OFF prohibition signal according to an embodiment of the present invention will be described with reference to FIG. 7.

FIG. 7 is a diagram explaining an operation of the OFF prohibition signal of the communication terminal device according to an embodiment of the present invention.

In FIG. 7, the estimated frame error rate Ferr(x) is equal to or greater than the allowable frame error rate due to the frame error (NG) due to the transmission OFF of frame #f6, and the radio unit OFF prohibition signal is activated. Further, the estimated frame error rate Ferr(x) becomes less than the allowable frame error rate due to OK of frame #f9 and the OFF prohibition signal is inactivated.

Third Embodiment

Next, a communication terminal device according to an embodiment of the present invention will be described with reference to FIG. 8.

Figure 8:
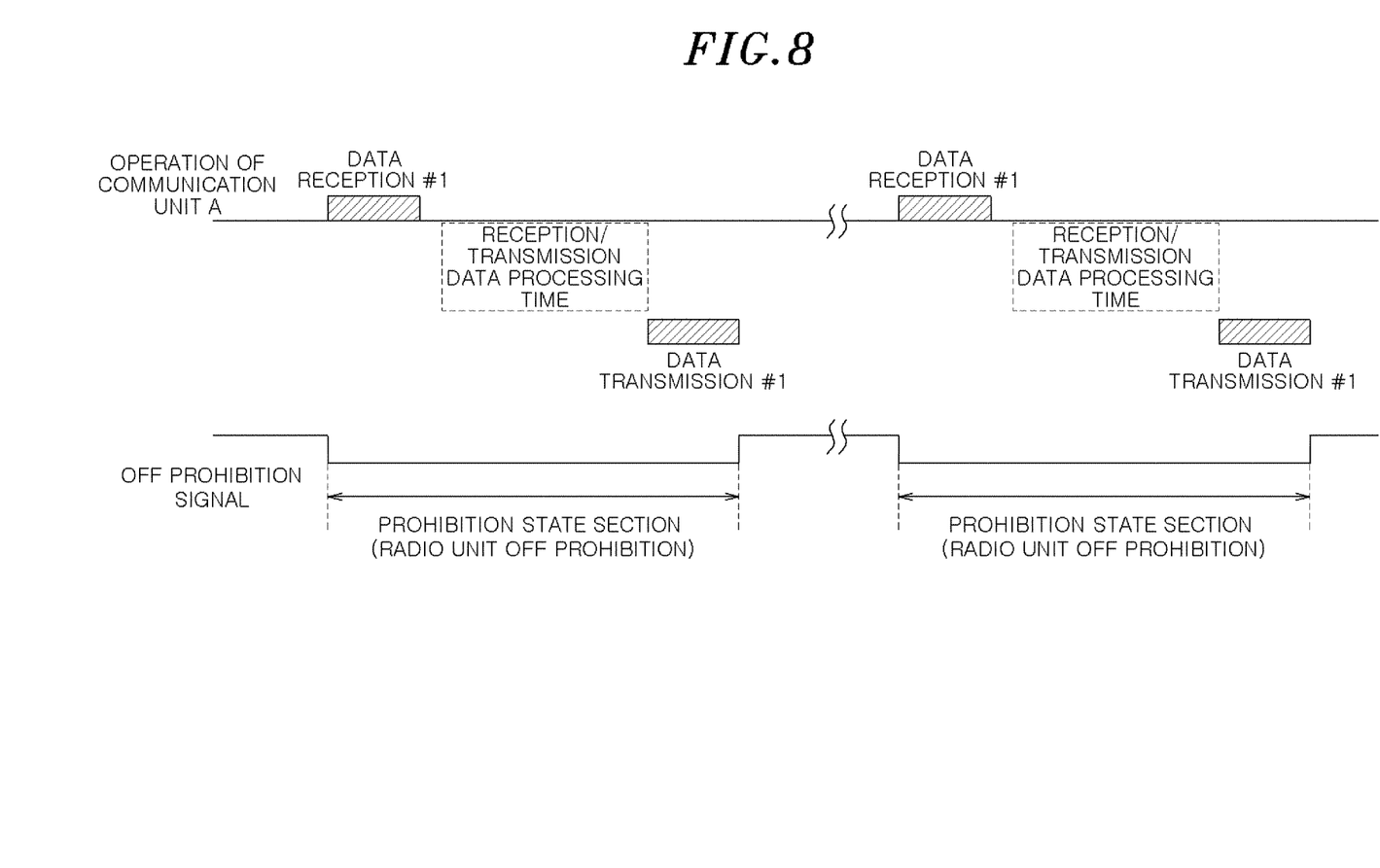
FIG. 8 is a diagram explaining an operation of the OFF prohibition signal during intermittent transmission/reception of the communication terminal device according to an embodiment of the present invention.

FIG. 8 is a diagram explaining an operation of the OFF prohibition signal during intermittent transmission/reception of the communication terminal device according to an embodiment of the present invention.

In wireless communication, generally, in a period in which communication is not performed, the communication terminal device enters a so-called standby state and performs intermittent transmission/reception.

In the intermittent transmission/reception, generally, since the amount of data to be transmitted and received is smaller than in the case of performing communication, the transmission/reception time is short and the transmission/reception is performed periodically. As shown in FIG. 8, it can be dealt with by activating the OFF prohibition signal so as to include the intermittent transmission/reception time.

In the communication terminal device according to the embodiment of the present invention, when a plurality of communication units corresponding to different communication schemes or communication systems are implemented in the same communication terminal device to perform communication in parallel, it is possible to prevent the communication terminal device from being inoperative due to excessive power consumption.

Although the present invention has been described in detail, it should be understood that the present invention is not limited to the communication terminal device described above, but can be widely applied to communication terminal devices other than the above-described communication terminal device.

DESCRIPTION OF REFERENCE NUMERALS 10, 40, 1000: communication unit A
20, 50, 2000: main control unit
30, 60, 3000: communication unit B
70: communication unit C
101, 401: antenna unit
102, 402: radio unit
103, 403: baseband unit
104, 404: external interface unit
105, 405: communication control unit

What is claimed is:

1. A communication control method for a communication terminal device including a plurality of communication units corresponding to different communication schemes or communication systems to perform communication in parallel, the method comprising:
   when a first communication unit performs transmission, stopping transmission/reception of another communication unit;
   setting a transmission/reception stop duration of the another communication unit to be equal to or less than a predetermined number of synchronization protection stages;
   determining a presence or absence of a transmission stop frame of the another communication unit;
   calculating an estimated frame error rate of the another communication unit;
   comparing the estimated frame error rate with a predetermined value; and
   prohibiting a transmission/reception stop of the another communication unit when the estimated frame error rate exceeds the predetermined value.

2. A communication control method for a communication terminal device including a plurality of communication units corresponding to different communication schemes or communication systems to perform communication in parallel, the method comprising:
   when a first communication unit performs transmission, stopping transmission/reception of another communication unit;
   setting a transmission/reception stop duration of the another communication unit to be equal to or less than a predetermined number of synchronization protection stages;
   determining that the another communication unit is in an intermittent transmission/reception state in a standby state;

prohibiting the transmission/reception stop when the another communication unit starts intermittent transmission/reception; and permitting the transmission/reception stop again when the another communication unit ends the intermittent transmission/reception.

3. A communication control method for a communication terminal device including a plurality of communication units corresponding to different communication schemes or communication systems to perform communication in parallel, the method comprising:

when a first communication unit performs transmission, stopping transmission/reception of another communication unit;

setting a transmission/reception stop duration of the another communication unit to be equal to or less than a predetermined number of synchronization protection stages;

transmitting radio waves by the plurality of communication units;

performing conversion from a radio frequency signal into a baseband signal, or conversion from a baseband signal into a radio frequency signal;

performing a baseband demodulation process or a data decoding process;

performing a data encoding process for transmitting data to network;

separating control data and user data in data communication with an outside;

turning transmission/reception ON/OFF by a control signal from the outside; and outputting a communication unit OFF prohibition signal to the outside.

4. The communication terminal device comprising a plurality of communication units corresponding to different communication schemes or communication systems and a control unit, wherein each of the communication units includes an antenna unit, a radio unit, a baseband unit, an external interface unit, and a communication control unit, and wherein the communication terminal device operates in the communication control method of the communication terminal device according to claim 1.

5. The communication terminal device comprising a plurality of communication units corresponding to different communication schemes or communication systems and a control unit, wherein each of the communication units includes an antenna unit, a radio unit, a baseband unit, an external interface unit, and a communication control unit, and wherein the communication terminal device operates in the communication control method of the communication terminal device according to claim 2.

6. The communication terminal device comprising a plurality of communication units corresponding to different communication schemes or communication systems and a control unit, wherein each of the communication units includes an antenna unit, a radio unit, a baseband unit, an external interface unit, and a communication control unit, and wherein the communication terminal device operates in the communication control method of the communication terminal device according to claim 3.

* * * * *